US012727532B2

(12) United States Patent
Flickinger et al.

(10) Patent No.: US 12,727,532 B2
(45) Date of Patent: Sep. 8, 2026

(54) UNLOAD TUBE SWING CYLINDER MOUNT FOR AGRICULTURAL VEHICLE

(71) Applicants: CNH Industrial America LLC, New Holland, PA (US); CNH Industrial Belgium N.V., Zedelgem (BE)

(72) Inventors: Wayne Flickinger, Oxford, PA (US); Frank Duquesne, Zwevegem (BE); Denver Yoder, Manheim, PA (US); Shaun O'Donnell, Quarryville, PA (US)

(73) Assignees: CNH Industrial America LLC, New Holland, PA (US); CNH Industrial Belgium N.V. (BE)

( * ) Notice: Subject to any disclaimer, the term of this patent is extended or adjusted under 35 U.S.C. 154(b) by 408 days.

(21) Appl. No.: 18/228,926

(22) Filed: Aug. 1, 2023

(65) Prior Publication Data

US 2025/0040482 A1 Feb. 6, 2025

(51) Int. Cl.
*A01D 41/12* (2006.01)

(52) U.S. Cl.
CPC ................................ *A01D 41/1217* (2013.01)

(58) Field of Classification Search
CPC .......................... A01D 41/1217; A01D 43/087
See application file for complete search history.

(56) References Cited

U.S. PATENT DOCUMENTS 3,190,423 A * 6/1965 Wenning ............ A01D 41/1208 248/278.1
3,638,812 A * 2/1972 Ryczek .............. A01D 41/1217 198/662
4,332,261 A * 6/1982 Webster ............. A01D 41/1217 56/16.6
4,459,079 A * 7/1984 Brelsford ........... A01D 41/1217 251/297
9,215,843 B2 * 12/2015 Cooksey ............ A01D 41/1226
2016/0286724 A1 * 10/2016 Duquesne ................. B60P 1/42
2017/0367261 A1 * 12/2017 Matousek ............ A01D 61/008

FOREIGN PATENT DOCUMENTS

CN 201758587 U 3/2011
CN 210840704 U 6/2020
EP 3078253 A1 10/2016
KR 20000001529 U 1/2000

OTHER PUBLICATIONS

The Extended European Search Report issued Dec. 10, 2024, by the European Patent Office in corresponding European Patent Application No. 24192476.0-1105. (9 pages).

* cited by examiner

*Primary Examiner* — Cathleen R Hutchins
(74) *Attorney, Agent, or Firm* — Buchanan Ingersoll & Rooney PC

(57) ABSTRACT

An actuator assembly for moving an unload tube of an agricultural vehicle between stowed and deployed positions. The actuator assembly includes a mount that is configured to be fixed to a fixed mounting point on the agricultural vehicle. An actuator of the actuator assembly has a first end that is mounted to the mount and a second end that is mounted to the unload tube for moving the unload tube between the stowed and deployed positions. A tension rod of the actuator assembly has a first end that is pivotably mounted to the mount and a second end that is mounted to a fixed tension rod mounting point located either on or adjacent the unload tube.

12 Claims, 7 Drawing Sheets

763
753
315
311
360
310, 312
350

330
320
751
504
506
332
601
322
316
360, 761

UNLOAD TUBE SWING CYLINDER MOUNT FOR AGRICULTURAL VEHICLE

BACKGROUND OF THE INVENTION

1. Field of the Invention

The present disclosure relates to a swing cylinder mount for an unload tube of an agricultural vehicle, such as a combine harvester.

2. Description of the Related Art

Agricultural vehicles, such as combine harvesters, commonly include an unload tube or unloading conveyor for distributing clean grain harvested by the combine harvester to another vehicle, such as the truck 102 shown in FIG. 2. An actuator is mounted to the unload tube for moving the tube from a stowed position, whereby the tube is positioned beside a grain tank of the combine harvester, to an extended or deployed position (see FIG. 2) where the tube is extended from the combine harvester and the outlet of the tube is positioned for delivering the clean grain from the combine harvester to the other vehicle beside the combine harvester. Described herein is a mount for the aforementioned actuator that is optimized for load transfer, weight, cost, and serviceability.

SUMMARY OF THE INVENTION

An actuator assembly for moving an unload tube of an agricultural vehicle between stowed and deployed positions. The actuator assembly includes a mount that is configured to be fixed to a fixed mounting point on the agricultural vehicle. An actuator of the actuator assembly has a first end that is mounted to the mount and a second end that is mounted to the unload tube for moving the unload tube between the stowed and deployed positions. A tension rod of the actuator assembly has a first end that is pivotably mounted to the mount and a second end that is mounted to a fixed tension rod mounting point located either on or adjacent the unload tube.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
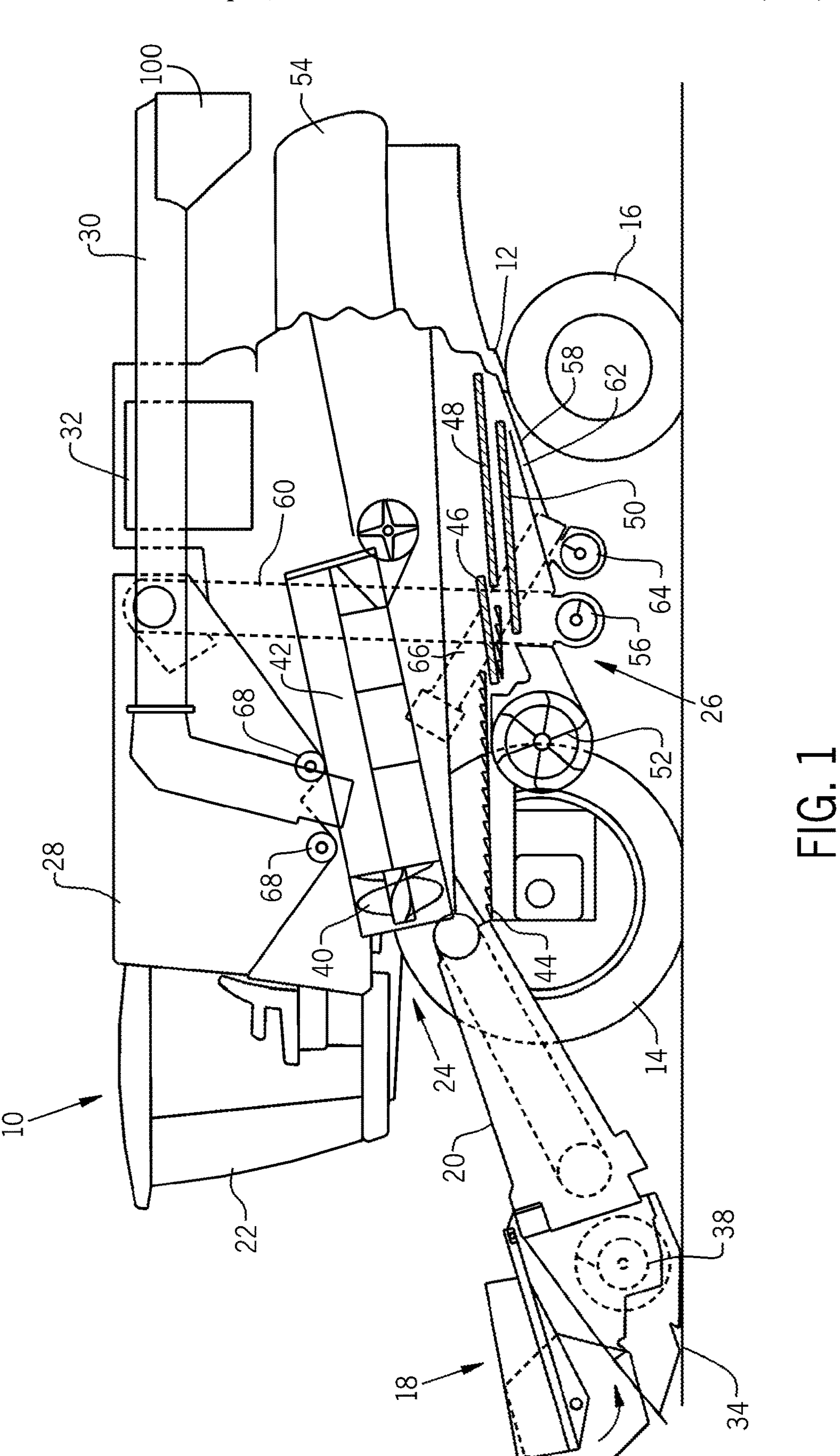
FIG. 1 is a side cutaway view of an embodiment of an agricultural harvester in the form of a combine, which is shown schematically.

Corresponding reference characters indicate corresponding parts throughout the several views. The exemplifications set out herein illustrate embodiments of the invention, and such exemplifications are not to be construed as limiting the scope of the invention in any manner.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw: Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading conveyor 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. The upper sieve 48 and lower sieve 50 can be carried within a common framework. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading conveyor 30 for discharge from combine 10. Unloading conveyor 30 may also be referred to in the art as an unload tube.

Figure 2:
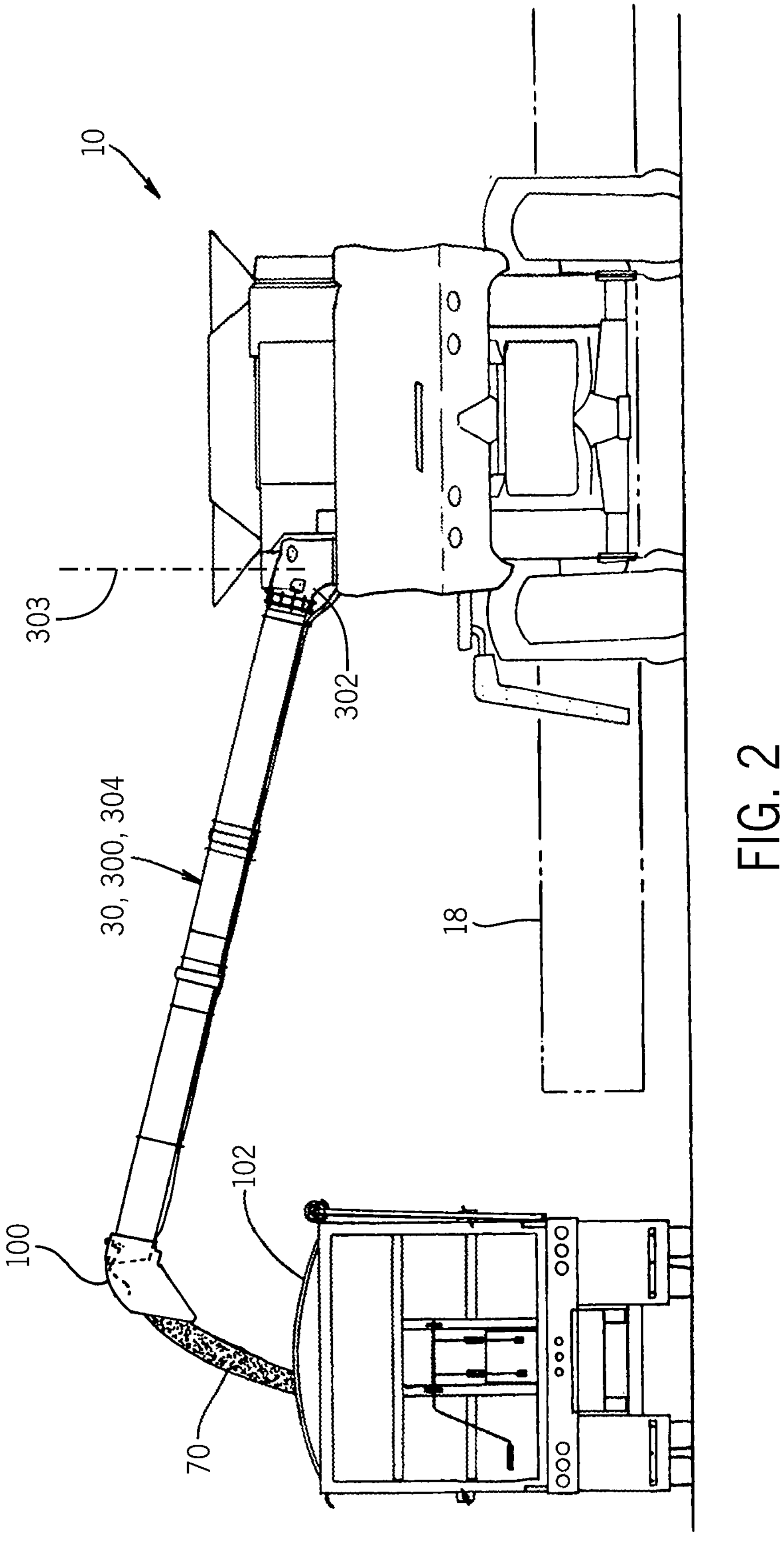
FIG. 2 is a rear end view of the combine of FIG. 1 showing grain unloading from an unloading conveyor of the combine into a truck.

FIG. 2 is a rear end view of the combine 10 of FIG. 1 showing grain unloading from unloading conveyor 30 of combine 10 into a truck 102. Unloading conveyor 30 is shown transversely extending and deployed outwardly in an unloading position as it unloads grain 70 through an unload spout 100 of conveyor 30 and into grain truck 102. This unloading operation can occur as combine 10 and truck 102 are moving, which is referred to as unloading “on the go”, or the unloading operation can occur in a stationary manner. At the end of the unloading operation, unloading conveyor 30 will be pivoted to a rearwardly directed transport position, extending along the adjacent side of combine 10. Pivoting of unloading conveyor 30 will be described in greater detail with reference to FIGS. 3-6. It can be noted here that truck 102 is located a substantial distance to the side of combine 10, which is desired to avoid the possibility of contact with header 18 mounted on the front of combine 10, particularly when unloading on the go. It should also be noted that conveyor 30, when in the unloading position illustrated, will typically be tilted up toward the outer end thereof, at a greater angle, compared to when in the transport position, as additional height is often required to clear the top of the grain receptacle, here illustrated by truck 102.

Figure 3:
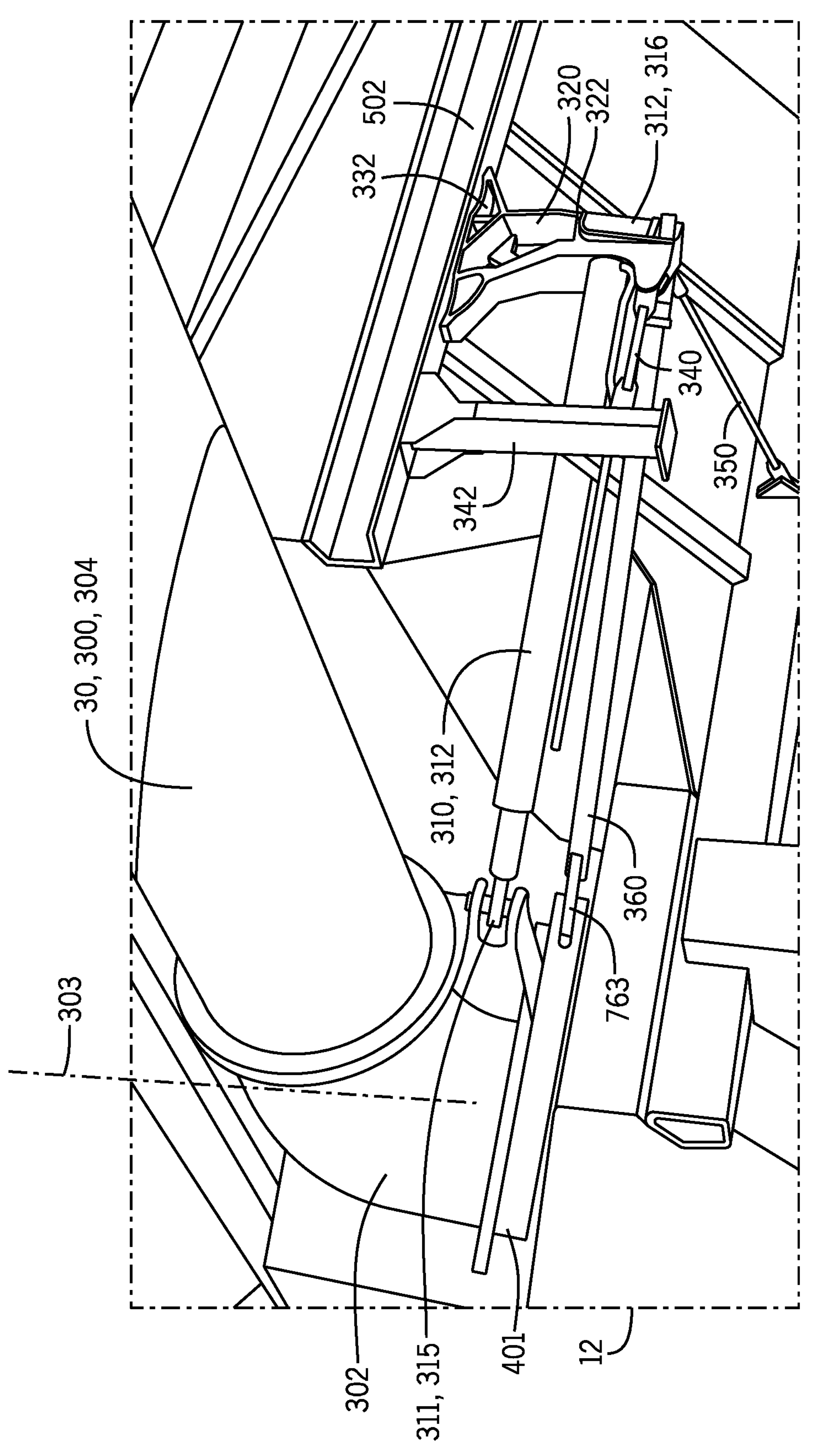
FIG. 3 depicts an isometric detailed view of the combine of FIG. 1 focusing on a region of the combine including a swing cylinder mount.

Turning now to FIG. 3, that figure depicts unloading conveyor 30 of combine 10 of FIG. 1. Unloading conveyor 30 includes an outer tube 300. As viewed in cross-section, outer tube 300 is not limited to a circular shape, and may take other shapes such as a square or rectangle. Outer tube 300 generally includes an elbow 302 that is rotatably mounted to a fixed mounting surface of combine, such as chassis 12 or grain tank 28. Elbow 302 is configured to rotate about axis 303 (FIG. 2). A hollow elongated tube 304 is fixed to elbow 302 and rotates therewith about axis 303. The bottom surface of elbow 302 rests and rotates upon a stationary flange 401 that is positioned beneath elbow 302 of outer tube 300. Flange 401 is stationary with respect to the pivotable outer tube 300 and pivotable elbow 302. Flange 401 may or may not be considered as forming part of conveyor 30. One or more augers (not shown) are positioned in tube 300 for transporting grain toward unload spout 100 that is mounted at the free end of conveyor 30. Outer tube 300, including elbow 302, is omitted in FIG. 4.

An actuator 310 is mounted to elbow 302 for rotating elbow 302 (and the entire conveyor 30) about axis 303 between the stowed position (FIGS. 1 and 3) and the deployed position (FIG. 2). Actuator 310 may also be referred to in the art as a swing cylinder. Actuator 310 has a piston 311 and cylinder 312 arrangement, which piston 311 is translatably positioned within cylinder 312 and may be actuated either hydraulically, pneumatically, electrically or mechanically, for example. Actuator 310 is omitted in FIG.

Turning now to FIGS. 3-7, the exposed end of piston 311 includes an eyelet connector 315 that is connected to elbow 302 by a pin, for example. One end of cylinder 312 includes a cylindrical mount 316 that is pinned to a mount 320 by a pin 322 such that cylinder 312 is capable of slight rotation with respect to mount 320 about the longitudinal axis 601 (FIG. 6) of pin 322. Actuator 310 may be said to comprise a first end (in the form of a cylindrical mount 316) that is pivotably connected to mount 320, and a second end (in the form of eyelet connector 315) that is pivotably connected to elbow 302.

Figure 6:
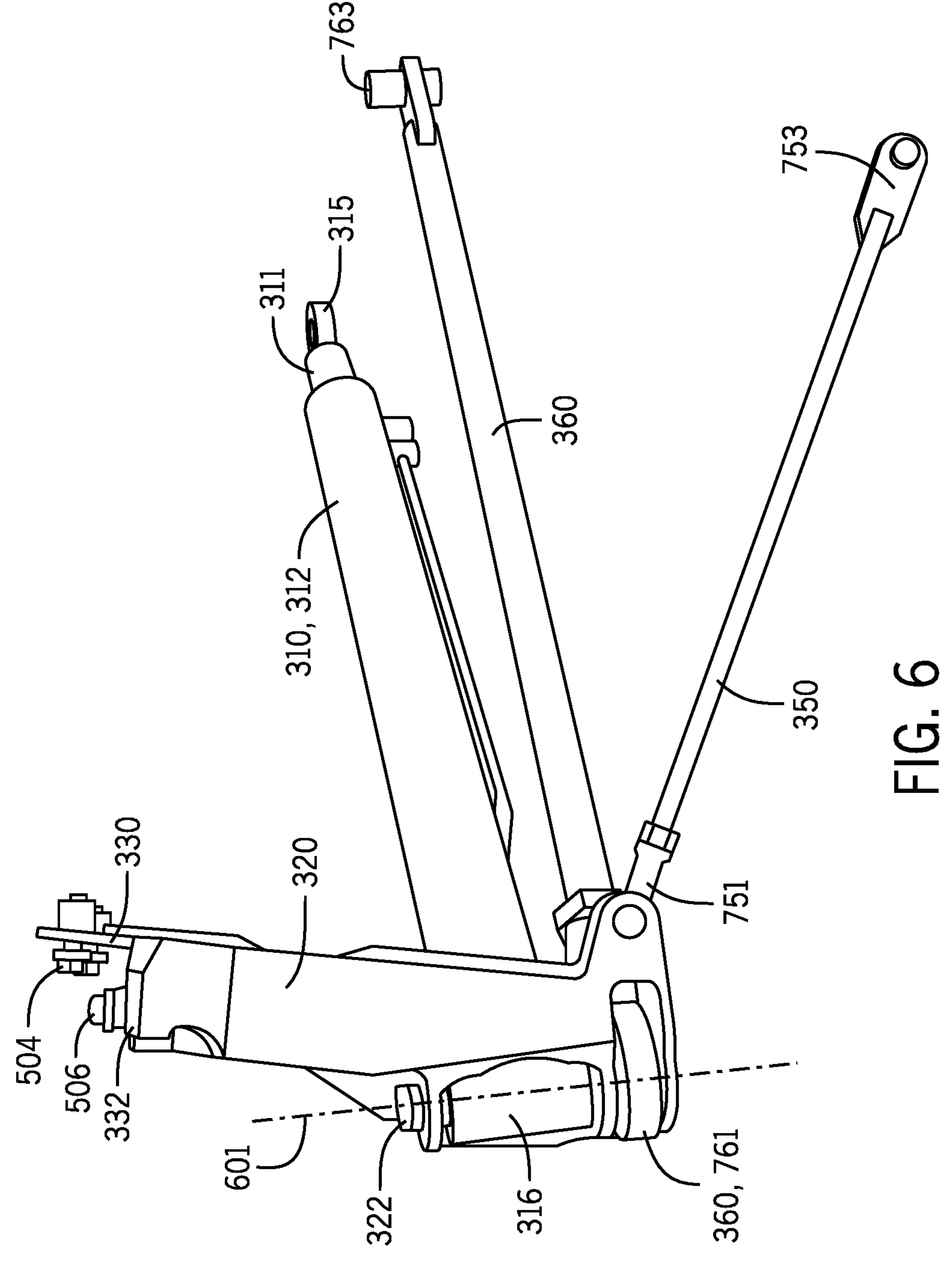
FIGS. 6 and 7 depict isometric views of the swing cylinder mount of FIG. 3.
Figure 7:
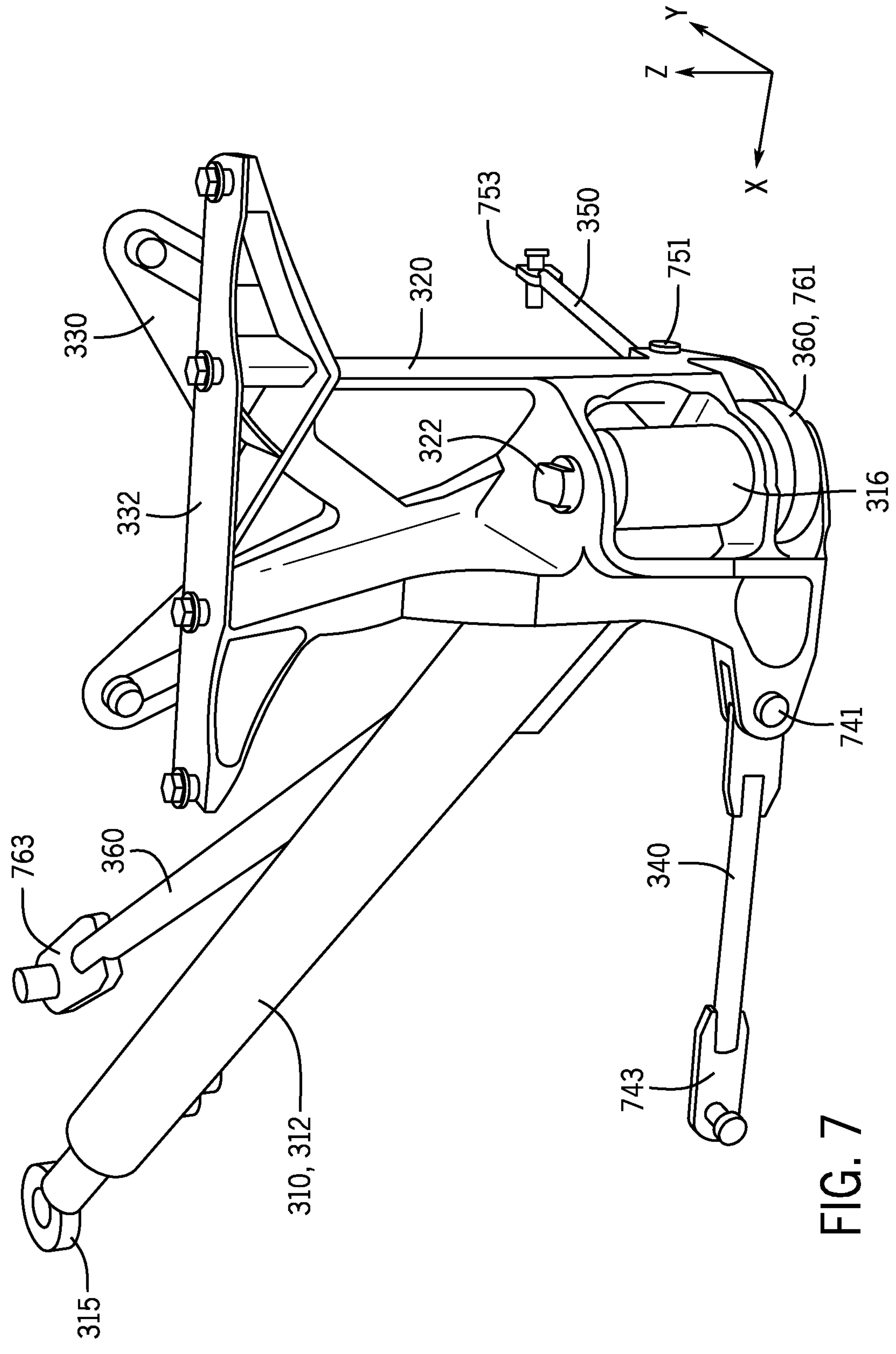

Mount 320 is provided for supporting actuator 310. Mount 320 includes a series of interconnected frame members that connect to actuator 310 as well as grain tank 28, chassis 12 (or other fixed mounting point) on combine 10. Mount 320 may comprise a unitized cast body or individual components that are welded or fastened together. Mount 320 includes a vertically oriented frame member 330 (FIG. 6) that is fastened to a vertical surface of longitudinal beam 502 (FIG. 5) of grain tank 28 (or chassis 12) by fasteners 504. Mount 320 also includes a horizontally oriented frame member 332 that is fastened to a horizontal surface of longitudinal beam 502 (FIG. 5) of grain tank 28 (or chassis 12) by fasteners 504. As best shown in FIG. 6, a recess is formed between two flanges of mount 320 for accommodating the body of cylindrical mount 316.

Mount 320 is additionally supported on combine 10 by three different rigid links 340, 350 and 360 that are connected to grain tank 28, chassis 12, and/or conveyor 30. The links extend in three different directions (e.g., x, y, and x-y directions of a Cartesian coordinate system), whereas the body of mount 320 extends in the z direction.

Link 340 is a solid and rigid bar or rod extending in the X-direction and having (i) a first end 741 that is pinned to the bottom end of mount 320, and (ii) a second end 743 that is pinned to a bracket 342 that extends vertically downward from beam 502. The pins at ends 741 and 743 extend in the Y-direction such that each pinned end is capable of pivoting about the Y-axis.

Link 350 is a solid and rigid bar or rod extending in the Y-direction and having (i) a first end 751 that is pinned to the bottom end of mount 320, and (ii) a second end 753 that is pinned to grain tank 28, chassis 12 (or other fixed mounting point on combine 10). The pins at ends 751 and 753 extend in the X-direction such that each pinned end is capable of pivoting about the X-axis. The pins at ends 751 and 753 extend orthogonally to the pins 741 and 743.

Figure 4:
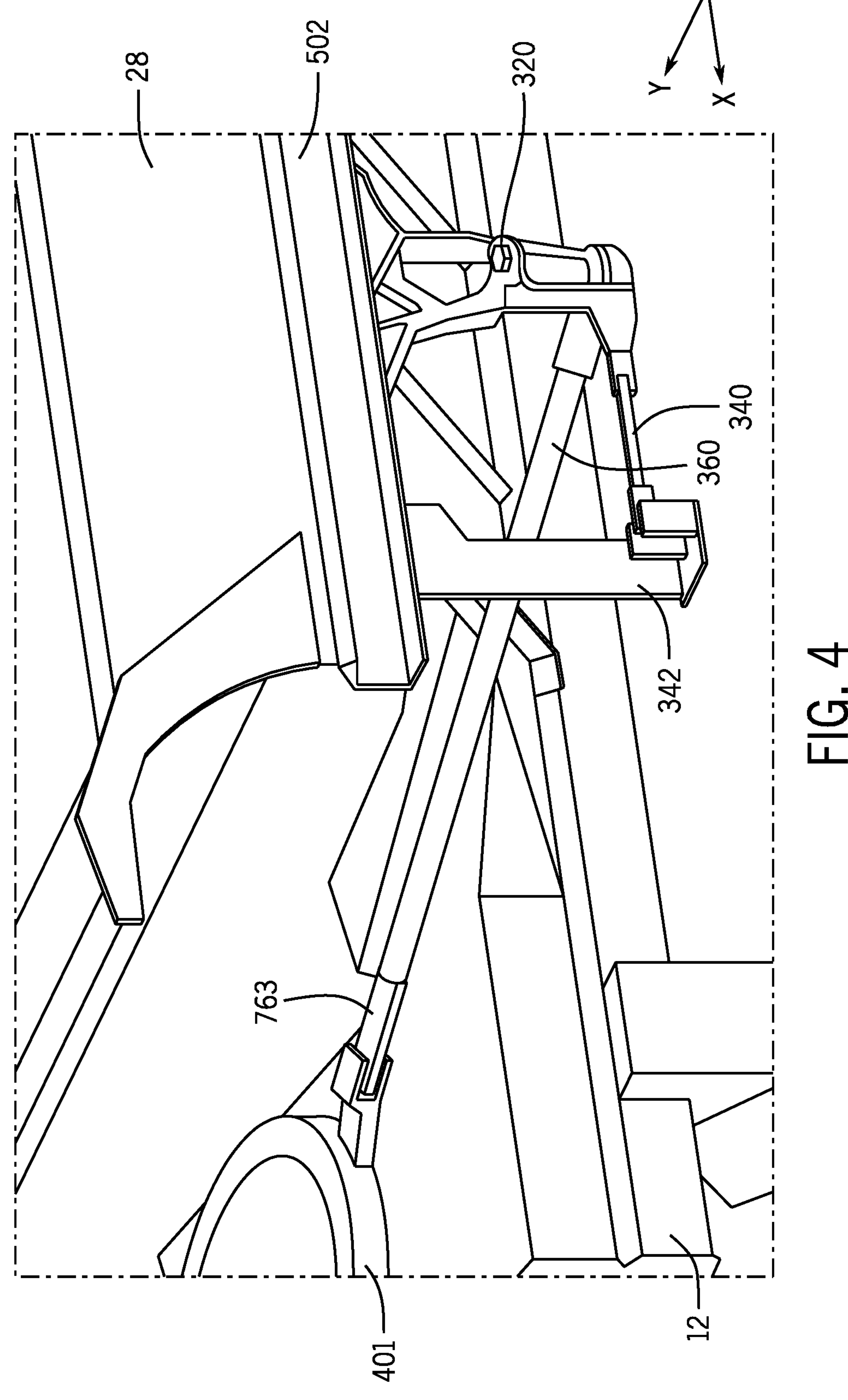
FIGS. 4 and 5 depict another isometric detailed view of the combine of FIG. 1.
Figure 5:
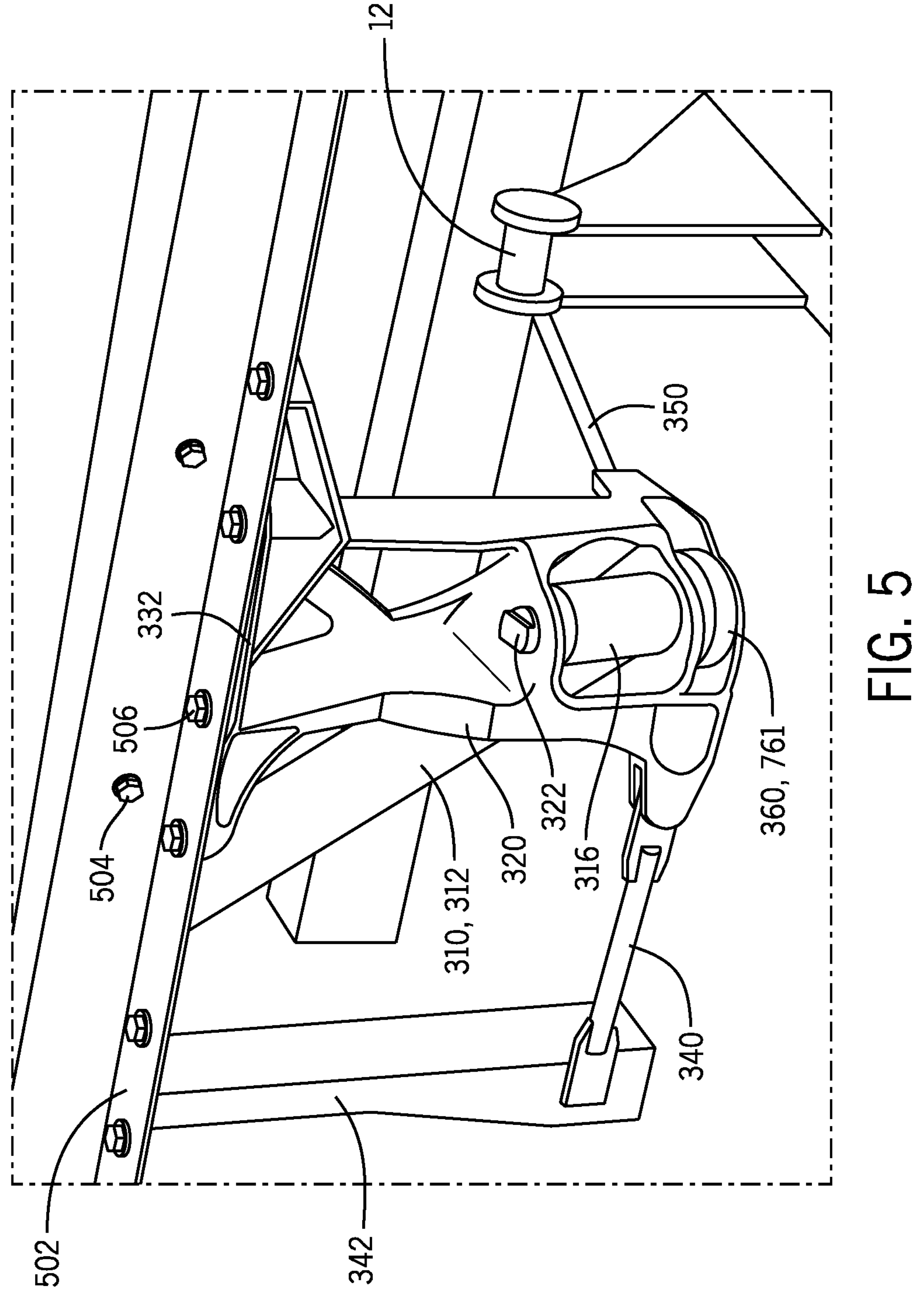

Link 360 may also be referred to herein as a tension rod. Tension rod 360 is a solid bar or rod extending in the X-Y direction and having (i) a first end 761 that is pinned to the bottom end of mount 320 by pin 322 (i.e, the same pin that secures cylinder 312), and (ii) a second end 763 that is pinned to flange 401 (FIG. 4). The flange 401 may also be referred to herein as a fixed tension rod mounting point.

Tension rod 360 may extend parallel to cylinder 312. First end 761 of tension rod 360 comprises an eyelet connector that is positioned within a recess formed in mount 320 that is located beneath cylinder mount 316 of cylinder 312. First end 761 is capable of pivoting about axis 601. The pins at ends 761 and 763 extend in the Z-direction such that each pinned end is capable of pivoting about the Z-axis. Stated differently, the pins at ends 761 and 763 extend orthogonally to the pins 741 and 743 as well as pins 751 and 753. Tension rod 360 is mounted at an elevation below actuator 310.

Considered together, mount 320, and links 340, 350 and 360 may together constitute a mount assembly or swing cylinder mount. Additionally, mount 320, actuator 310 and links 340, 350 and 360 may together constitute an actuator assembly.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle comprising:

a clean grain storage tank;

an unload tube through which clean grain is expelled from the clean grain storage tank, the unload tube being pivotably mounted to the clean grain storage tank about a vertical axis between a stowed position in which the unload tube is positioned beside the clean grain storage tank, and a deployed position in which the unload tube extends outwardly from the clean grain storage tank; and an actuator assembly that moves the unload tube between the stowed and deployed positions, the actuator assembly comprising:

a mount fixed to a fixed mounting point on the clean grain storage tank;

an actuator having a first end mounted to the mount and a second end mounted to the unload tube that moves the unload tube between the stowed and deployed positions;

a tension rod having a first end being pivotably mounted to the mount and a second end that is mounted to a fixed tension rod mounting point located either on or adjacent the unload tube;

a first rigid link having a first end being pivotably connected to the mount and a second end being pivotably connected to another fixed mounting point on the agricultural vehicle; and a second rigid link having a first end being pivotably connected to the mount and a second end being pivotably connected to yet another fixed mounting point on the agricultural vehicle.

2. The agricultural vehicle of claim 1, wherein the tension rod and the actuator are pivotably coupled to the mount.

3. The agricultural vehicle of claim 2, wherein the tension rod and the actuator are pivotably coupled to the mount about the same axis.

4. The agricultural vehicle of claim 3, wherein the tension rod and the actuator are pinned to the mount by a same pin.

5. The agricultural vehicle of claim 1, wherein the fixed tension rod mounting point is disposed on a stationary flange that mates with the unload tube.

6. The agricultural vehicle of claim 1, wherein the tension rod is pivotable relative to the mount about an axis orthogonal to a longitudinal axis of the tension rod.

7. The agricultural vehicle of claim 1, wherein the tension rod is pivotable relative to the mount about an axis orthogonal to an extension axis of the actuator.

8. The agricultural vehicle of claim 1, wherein the mount comprises a unitary component.

9. The agricultural vehicle of claim 1, wherein the actuator comprises a piston translatable within a cylinder, and the piston being actuated hydraulically, electrically, mechanically, or pneumatically.

10. The agricultural vehicle of claim 1, wherein the agricultural vehicle comprises a combine harvester.

11. An actuator assembly that moves an unload tube of an agricultural vehicle between stowed and deployed positions, the actuator assembly comprising:

a mount fixed to a fixed mounting point on the agricultural vehicle;

an actuator having a first end mounted to the mount and a second end mounted to the unload tube that moves the unload tube between the stowed and deployed positions;

a tension rod having a first end being pivotably mounted to the mount and a second end mounted to a fixed tension rod mounting point located either on or adjacent the unload tube;

a first rigid link having a first end being pivotably connected to the mount and a second end being pivotably connected to another fixed mounting point on the agricultural vehicle; and a second rigid link having a first end being pivotably connected to the mount and a second end being pivotably connected to yet another fixed mounting point on the agricultural vehicle;

wherein the first rigid link is pivotable relative to the mount about a first axis, and the second rigid link is pivotable relative to the mount about a second axis that is orthogonal to the first axis.

12. The actuator assembly of claim 11, wherein the tension rod is pivotable relative to the mount about a third axis that is orthogonal to the first and second axes.

* * * * *